July 2, 1963 A. FINELT 3,095,605
VULCANIZER PRESS WAX INJECTORS FOR MOLDS
Filed June 7, 1961 2 Sheets-Sheet 1

INVENTOR.
Aron Finelt
BY H. Lee Helms
attorney

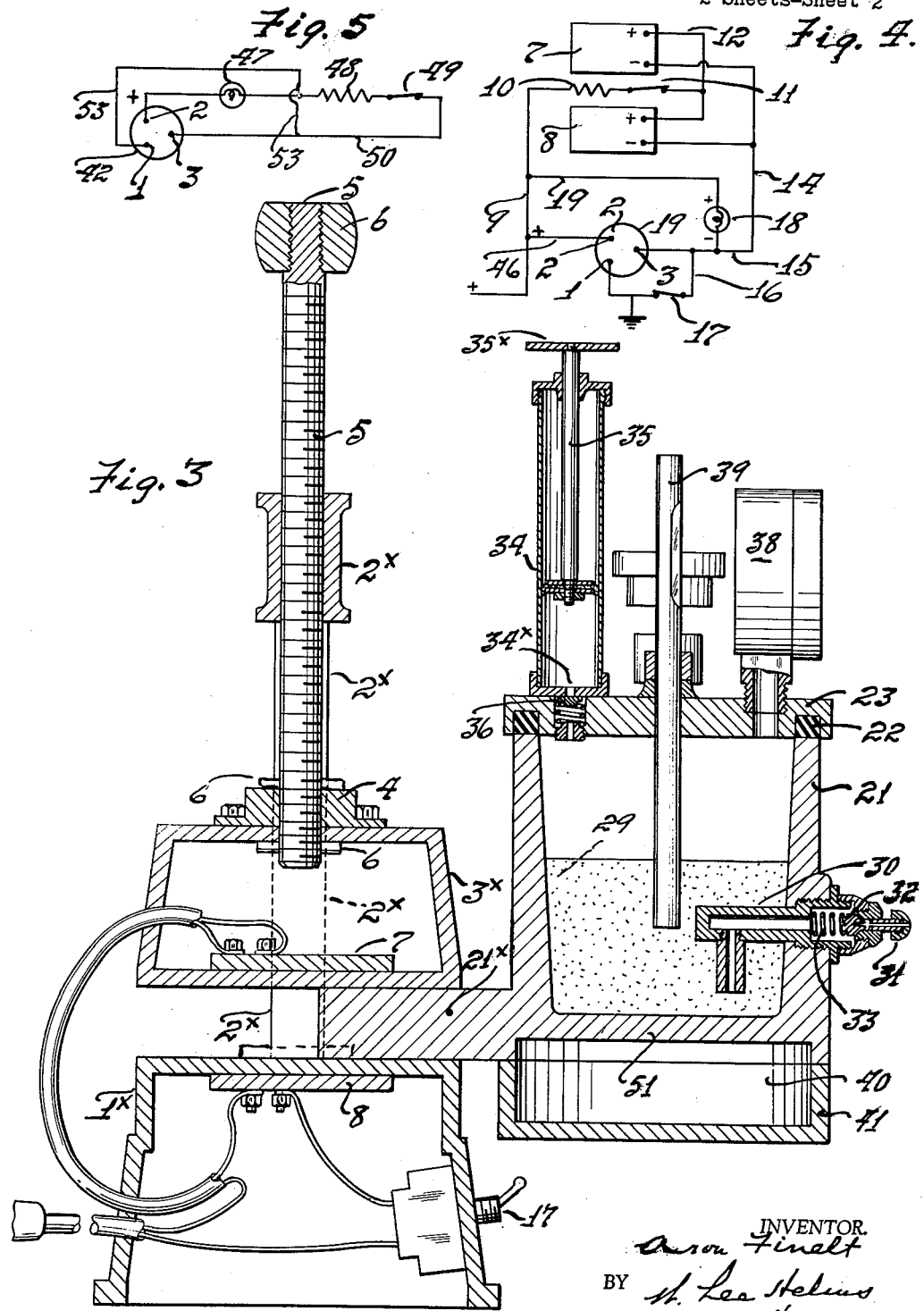

United States Patent Office 3,095,605
Patented July 2, 1963

3,095,605
VULCANIZER PRESS WAX INJECTORS
FOR MOLDS
Aron Finelt, 130—17 236th St., Laurelton, N.Y.
Filed June 7, 1961, Ser. No. 115,445
4 Claims. (Cl. 18—6)

The present invention relates to a combined vulcanizer press-wax injector for use in the manufacture of cast metal jewelry, and similar relatively-small objects. A method generally in use is to vulcanize a rubber investure over the objects, or plurality of objects, to be produced by a single casting, to cut the investure and remove the objects, forming a rubber mold; to place the mold in a flask; to inject wax into the rubber mold, thus forming a wax pattern; to invest the pattern with a ceramic material; burn out the wax in an oven, thus forming a ceramic mold for metal; and finally employ the mold for casting metals therein.

The present invention combines a rubber vulcanizer press with a wax injector in such manner that the heating elements for the vulcanizer are employed to transfer heat to the injector for bringing the wax into proper fluid consistency for injection into a rubber mold, and the injector so controls the vulcanizer press that its heating elements are shut off from operation by the injector when the wax reaches a predetermined temperature. In other words, when the injector is applied to the vulcanizer and the electrical controls of the injector are plugged into the electrical controls of the vulcanizer, the electrical circuit for the vulcanizer is included as a part of the injector circuit. When the injector is detached from the vulcanizer, with its electrical circuit and plug, press operation of the vulcanizer may continue as before.

The invention will be described with reference to the accompanying drawings, in which:

FIG. 3 is a vertical section taken on the line 3—3, FIG. 2.

FIG. 4 is a wiring diagram for the vulcanizer press.

FIG. 5 is a wiring diagram for the wax injector. In FIG. 4 the numerals 1, 2, and 3 indicate sockets in a socket member, and in FIG. 5 the same numerals indicate corresponding plugs for said sockets.

Figure 2:
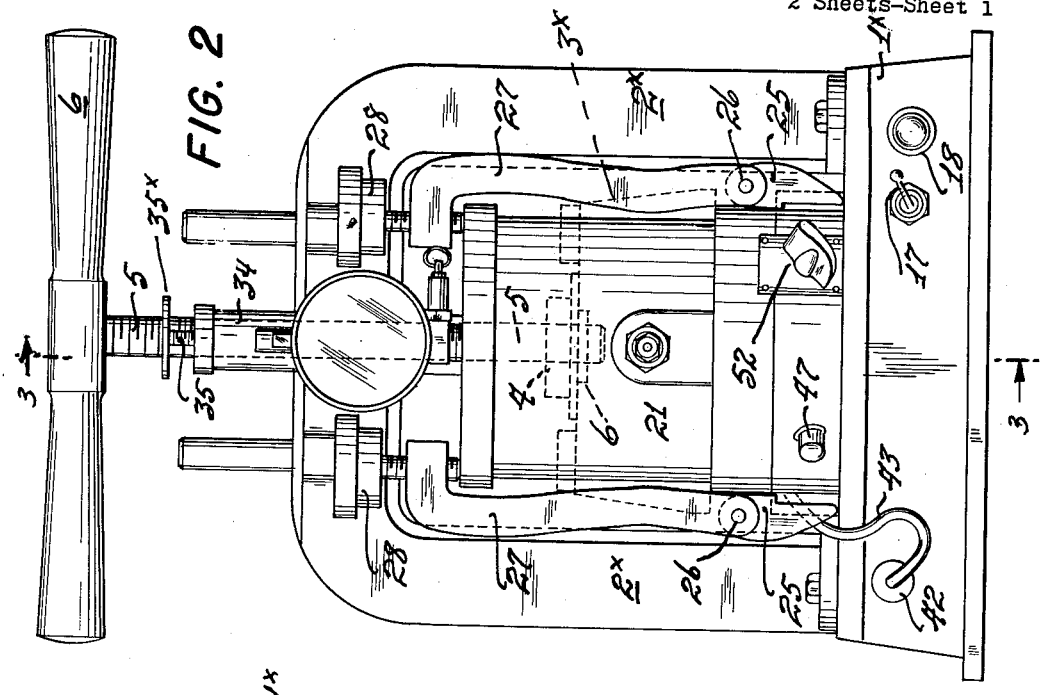
FIG. 2 is a front elevation of the assembly shown in FIG. 1.

The invention is particularly applicable to the "lost wax" process.

Referring to the drawings, I have shown at $1^\times$ a base member of a vulcanizer press. Mounted on base member $1^\times$ is an inverted U-shaped frame $2^\times$ providing a centrally disposed open space. Within the said space is the upper and movable platen of the vulcanizer press as shown at $3^\times$.

Press-platen $3^\times$ has secured to the top thereof an apertured block 4, which loosely receives the end of a screw 5 having an operating handle 6 at its top.

Rotation of the screw will raise or lower platen $3^\times$ because of the threaded engagement of the screw 5 in the upper member of the frame $2^\times$, and in this movement collars or pins 6 secured to the screw below block 4 and above the same, transfer the vertical movements of the screw to platen $3^\times$ whilst enabling rotation of the screw relatively to the platen.

Vulcanizer press-platen $3^\times$ is hollow except for one end plate (not shown), the plate being movable for placing a heating plate element 7 within the platen, as shown in FIG. 3, together with plus and minus electrical connections, to be better visualized by reference to FIG. 4. Also, the upper wall of base member $1^\times$ has applied thereto an electrical heating plate 8, as also shown in FIG. 3.

The wiring as shown in FIG. 3 for the vulcanizer press is only schematically shown, because the complete circuit is shown in FIG. 4. That figure will now be described.

From an electrical current source, current flows through positive lead 9 to a thermostat 10, controlling a switch at 11 for making and breaking the circuit to the heating plates 7 and 8. This thermostat is preferably located in the hollow platen $3^\times$. The heating plates are conductors and from the make and break thermostat 10, the current flows through lead 12 to the positive contacts for the plates, whereas the negative contacts for the plates are connected to lead 14, and thence to branch leads 15 and 16. In the latter is a manual switch 17, and lead 16 is grounded.

At 18 is an indicator bulb lamp which receives current from the positive lead 9 via wire lead 19, the negative pole of the lamp being connected to ground wire 15.

In addition to the above, the circuit for the vulcanizer includes a socket member $19^\times$. The socket at 1 is connected to the ground. The socket at 3 is connected to negative wire 15, and the socket at 2 is connected to positive lead wire 9.

It will be seen from the above that the circuit closing for the vulcanizer is dependent upon closing switch 17, and that the opening of the switch breaks the circuit. Also, it will be seen that the circuit is adapted to be broken by action of the thermostatic switch 10, 11, in positive lead 9.

The wax injector is a cast metal body 21 having a laterally projecting heat receiving contact arm $21^\times$ adapted to be placed between base member 1 and platen of the vulcanizer press. In the present embodiment, the body member 21 is round and its top rim supports a sealing ring 22, the latter fitting within an annular cavity in removable cap 23.

As shown in FIG. 2, when the wax injector has its heat conductor plate $21^\times$ moved to full contact position under the platen 3, and screw 5 is operated to impose pressure upon plate $21^\times$, a desired thermal conduction from the vulcanizer to the wax injector will be secured, and the injector will be held with full support by the vulcanizer.

As shown in FIG. 2 (but omitted in FIG. 3), the body 21 of the wax injector carries opposed pivot supports 25 for pivot pins 26 passed through apertures in swing clamp members 27, the latter having threaded therein pressure screws, with thumb pieces as indicated at 28, FIG. 2. The ends of these screws are adapted to bear down upon cap 23 for injector body 21 for holding the latter in sealed relation to body member 21, the latter holding the wax indicated at 29, FIG. 3.

Threaded in member 21 for projection into the wax area is a wax receiving duct 30 leading to a pressure-operated valve nozzle 31 at the outer end of the duct 30. This nozzle carries a closure button 32 engaged by a spring 33. When the nozzle is pressed against the opening of a rubber mold, the button 32 moves back against the tension of spring 33 and wax under pressure will be forced out of the nozzle, the wax, of course, being in hot fluid condition.

For effecting pressure within the wax chamber of member 21, cap 23 carries a pump cylinder 34, having a rod operated piston 35 therein, the rod having a hand disk $35^\times$. The aperture at the base of cylinder 34, indicated at $34^\times$, is controlled by a spring press valve member 36 in cap 23 in such manner that pressure imposed by the pump formed by said elements will unseat the valve, and release of the pressure will seat the valve to hold the pressure within the wax containing body member 21.

Any suitable type of gauge 38 may be mounted in cap 23 to visually indicate the pressure raised within. Also, the cap supports a temperature indicating thermometer, led into the wax area of member 21, as indicated at 39.

Within the chamber 40, part of which is formed by a removable cup 41, are located the electrical controls and circuit elements shown in FIG. 5, minus the plug 42 and the outer end areas of the wires led hereto. The socket member 19×, as shown in FIG. 4, as applied to the vulcanizer, receives plug 42, the connected position of the plug being indicated in FIG. 1. The plug circuit connecting studs 1, 2, 3, will be received in the correspondingly numbered circuit connecting sockets of the socket member 19×, FIG. 4, carried by the vulcanizer press.

Figure 1:
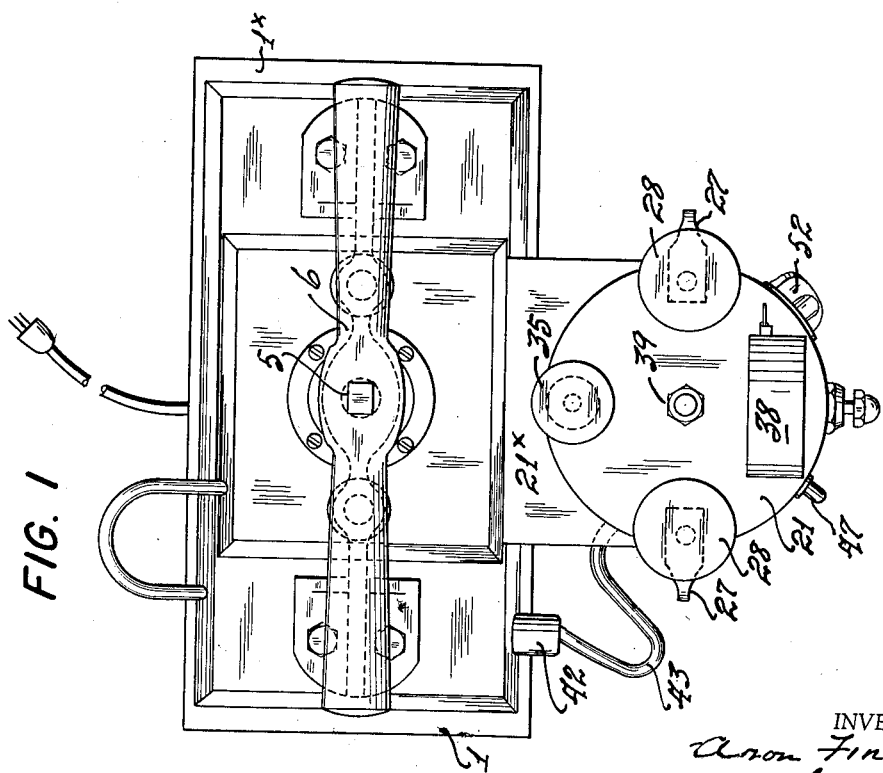
FIG. 1 is a top plan view of the vulcanizer press and wax injector in cooperative assembly.

Referring to FIG. 5 and positive lead 45, it will be seen that plug stud 2 receives positive current from the corresponding socket 2, FIG. 4, vie wire 46. The current flows through sight lamp 47, the position of which is indicated at FIGURES 1 and 2, any suitable adjustable thermostat 48 which controls switch 49 in the negative lead wire 50. The thermostat with its switch is located at the base of the wall 51 above chamber 40, wall 51 being the bottom wall of the wax chamber in the wax injector. Inasmuch as adjustable thermostatic switches are well known in heat controlled electrical appliances, the adjustment has not been shown in the drawings, except to indicate in FIGS. 1 and 2 a turn button 52 therefor.

Reference to FIGURE 5 will show that the negative wire leads to plug 1, which enters socket 1 of FIG. 4, the latter being grounded. Negative wire 50 may also lead to plug 3 of plug member 42.

When the wax injector is applied to the vulcanizer press, and plugged in, switch 17, FIG. 4, will be opened, thus throwing out the independent circuit for the vulcanizer press, and making the latter dependent upon the circuit in the wax injector. At this point the negative lead from the vulcanizer press will pass from socket 3 to the corresponding plug 3, FIG. 5, then from negative wire 53 to plug 1, FIG. 5, which is connected to socket 1, FIG. 4, the latter being grounded.

When the temperature of the molten wax in the wax injector reaches a predetermined degree in accordance with thermostatic switch 48, FIG. 5, the latter will act to open the switch 49, and there will be no ground lead for the plate heating circuit, FIG. 4.

By means of the invention, a rubber mold for jewelry and the like may quickly be vulcanized in its flask by means of the vulcanizer press, and immediately thereafter the wax injector may form a part of the press for thermal conduction and heating plate control by the thermostatic switch of the injector. The injector comprises a self-contained pressure unit, no oxygen-or-air compressor being required, and precision thermostatic control is afforded. Work time is minimized, and the simplification has particular utility for small jewelry manufacturers, model makers and many other users.

Having described my invention, what I claim and desire to secure by Letters Patent, is as follows:

1. A vulcanizer press-wax injector for molds comprising a platen-press adapted as a vulcanizer and a wax injector coactive to transfer heat by conduction from the press to the injector after a pressing and thermal action of the press, and coactive to revert said heat transfer, and consisting of a press base-member formed with a horizontal platen and an electrically induced heating element carried by the platen, a movable press platen overlying the base platen, and an electrically induced heating element carried by said movable press platen, an electric circuit leading to said heating elements and including a preset thermostatic switch, and a manually operated switch, each for make-and-break of the circuit, a wax injector body having a lateral thermal-conducting plate adapted to be brought under the press platen of the vulcanizer means for clamping said plate between the press platen and the base platen of the vulcanizer press, an electric circuit in the wax injector and including a thermostatic switch, the circuit for the vulcanizer press including a plug-in member having three contacts, and the circuit for the wax injector having a coacting plug-in device with at least two contacts corresponding with like contacts in the plug-in device of the vulcanizer press and to be received therein, the connecting contacts for the two plug-in devices and their circuits, being adapted to restore the circuit in the vulcanizer press broken by operation of said manual switch, and thermal operation of the thermostatic switch in the wax injector being adapted to break said circuit to the heating plate of the press.

2. A vulcanizer press-wax injector for molds constructed in accordance with claim 1, in which the platen of the press is hollow with a bottom wall, a conductor-plate heating element on the inner face of said bottom wall, a press support under said platen and having a top wall, a conductor heating element applied to the under face of said support top wall, means for moving the platen up and down relatively to the said support and for clamping the thermal-conducting plate of the wax injector body, a wax containing chamber in the last named body and having a bottom wall, a second chamber below said bottom wall and normally closed by a cup-plate, the thermostatic switch for the wax injector being disposed in said last named chamber against the lower face of its bottom wall, the electric circuit for the wax injector, minus its plugged in member, being disposed in said chamber, air pressure means being applied to the wax injector, together with a pressure gauge and a thermal indicator, and a spring-release outflow injector carried by said wax injector.

3. A vulcanizer press-wax injector for molds constructed in accordance with claim 1, in which a contact of the plug-in device for the wax injector embodies a contact adapted to be brought into contacting abutment with one polar lead of the circuit in the vulcanizer press, the latter having two additional polar leads, one of which is broken by the manual switch to open the circuit in the vulcanizer press with like action upon the second lead of the two leads, and the plug-in device for the wax injector circuit having, with its first named contact, an additional contact adapted to bridge positive and negative contacts and leads for the vulcanizer press circuit to restore said circuit when its manual switch is open, the circuit then depending upon make-and-break of the thermostatic switch in the wax injector circuit.

4. A vulcanizer press-wax injector for molds constructed in accordance with claim 1, in which the vulcanizer press comprises a base member having a top wall, a frame rising upwardly from said base member, a manually operated screw carried by said frame, the platen being connected to said screw against longitudinal movement thereon, whilst permitting rotation of the screw, the laterally projecting thermal plate of the wax injector being adapted for reception between the press base support and platen and for clamping action by the latter, a removable cover for the chamber of the wax injector, a sealing ring carried by said cover, swing arms carried by the base of the wax injector and screw studs applied to said swing arms and adapted to exert sealing pressure upon the top of said cover.

References Cited in the file of this patent

UNITED STATES PATENTS

| 2,398,939 | Horn | Apr. 23, 1946 |
| 2,683,025 | Matulaitis | July 6, 1954 |